US009643586B2

(12) United States Patent
Blattert et al.

(10) Patent No.: US 9,643,586 B2
(45) Date of Patent: May 9, 2017

(54) METHOD FOR RELEASING AN AUTOMATIC PARKING BRAKE

(71) Applicant: Robert Bosch GmbH, Stuttgart (DE)

(72) Inventors: Dieter Blattert, Kirchheim/Neckar (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/590,451

(22) Filed: Jan. 6, 2015

(65) Prior Publication Data
US 2015/0217743 A1    Aug. 6, 2015

(30) Foreign Application Priority Data

Feb. 6, 2014 (DE) .................. 10 2014 202 173

(51) Int. Cl.
*B60T 13/74* (2006.01)
*B60T 8/171* (2006.01)
*B60T 7/12* (2006.01)
*B60T 13/58* (2006.01)
*F16D 55/226* (2006.01)

(52) U.S. Cl.
CPC ............ *B60T 13/746* (2013.01); *B60T 7/122* (2013.01); *B60T 8/171* (2013.01); *B60T 13/588* (2013.01); *F16D 55/226* (2013.01)

(58) Field of Classification Search
CPC ......... B60T 13/746; B60T 7/171; B60T 8/122

USPC ........................................... 701/70
See application file for complete search history.

(56) References Cited

U.S. PATENT DOCUMENTS

| 2004/0026989 | A1* | 2/2004 | Suzuki | B60T 17/16 303/89 |
| 2006/0261764 | A1* | 11/2006 | Erben | B60T 7/045 318/139 |
| 2010/0308645 | A1* | 12/2010 | Maron | B60T 13/588 303/20 |
| 2013/0261917 | A1* | 10/2013 | Kotake | B60T 13/741 701/70 |
| 2014/0196994 | A1* | 7/2014 | Schneider | B60T 13/588 188/152 |

FOREIGN PATENT DOCUMENTS

DE    10 2012 202 962.1 A1    8/2013

* cited by examiner

*Primary Examiner* — Yazan Soofi
(74) *Attorney, Agent, or Firm* — Maginot, Moore & Beck LLP

(57) ABSTRACT

A method for releasing an automatic parking break includes estimating a release travel of the automatic parking brake based on a measured motor voltage and a motor current. The method further includes querying an additional switch-off criterion to obtain a minimum total release travel. The method further includes comparing the estimated release travel with the minimum total release travel. The automatic parking brake includes an electric motor brake device for producing an electromechanical clamping force.

12 Claims, 3 Drawing Sheets

METHOD FOR RELEASING AN AUTOMATIC PARKING BRAKE

This application claims priority under 35 U.S.C. §119 to patent application no. DE 10 2014 202 173.1 filed on Feb. 6, 2014 in Germany, the disclosure of which is incorporated herein by reference in its entirety.

The disclosure relates to a method for releasing an automatic parking brake, a regulator or controller and an automatic parking brake.

BACKGROUND

An automatic parking brake is known for example from DE 10 2012 202 962 A1. With such automatic parking brakes a clamping force is applied to a brake disk by means of a spindle drive that is driven by an electric motor. The automatic parking brakes of the type discussed here are those without a Hall sensor or other sensors for calculating the revolution rate of the motor. Rather, the clamping and release process of the automatic parking brake is essentially controlled using an analysis of the motor voltage and of the motor current, giving information about the travel of the spindle and the clamping force of the brake by the use of a suitable algorithm. Parking systems of this type have the advantage that no sensors are necessary and the braking force can be estimated within the control electronics, which enables them to be disposed spatially separately from the brake motors. The challenge with the automatic parking brakes operated without sensors is that lower accuracy must be accepted during the clamping and release process. In particular, during the release process the problem arises that the motor currents are very low because of the reducing clamping force. During the measurement of the low motor currents, measurement errors that cannot be compensated can occur because of sometimes considerable measurement deviations, which remain undetected despite redundant detection of the motor currents and voltages. The measurement errors can thus result in an incorrect calculation of the travel of the spindle nut and thus in insufficient opening of the automatic parking brake and a resulting residual drag torque.

SUMMARY

The object of the present disclosure is therefore to provide a method for releasing an automatic parking brake with which the negative effects of a current measurement error on the release process of the automatic parking brake are avoided, and sufficient opening of the automatic parking brake is ensured at any time without the provision of a cost-intensive and calibrated measurement system.

The above-mentioned object is achieved by the features of the disclosed subject matter. Developments of the disclosure are specified in the disclosed subject matter.

The method is used to release an automatic parking brake comprising an electric motor brake device for producing an electromechanical clamping force, wherein preferably a release travel of the automatic parking brake is estimated based on a measured motor voltage and a measured motor current, and the estimated release travel is compared with a specified minimum total release travel. The method thereby preferably particularly omits sensors that are provided for revolution rate measurement. In this case at least one additional switch-off criterion is queried in order to ensure achievement of the minimum total release travel.

A significant advantage of the disclosure is that the release process of the automatic parking brake is no longer based on the calculation of an estimated value that is based on measured motor currents and voltages. Rather, at least one further switch-off criterion is used to make sure that the automatic parking brake is open wide enough and there is no residual drag torque between the brake lining and the brake disk. By means of the additional switch-off criterion, it is possible to avoid a premature interruption of the release process and thus inadequate release travel of the automatic parking brake because of an (undetected) current measurement error. Rather, it is ensured that the automatic parking brake is sufficiently wide open at each point in time by the use of the additional switch-off criterion.

With the method according to the disclosure, the at least one additional switch-off criterion can be a period of time measured from the start of the release process and gives the minimum transition time of the release process to guarantee sufficient opening of the automatic parking brake. The period of time can be a minimum or a maximum period of time in this case. By specifying a minimum period of time from the start of the release process, it is ensured that the specified release travel would actually already have been fully traversed by the spindle when the estimated release travel corresponds to the specified release travel. By contrast, in addition or alternatively release travel can be limited in the increasing direction by the specification of a maximum period of time. Therefore if the condition of the specified maximum period of time is met or is no longer met, the brake motor is switched off and the release process is ended. The same also applies in the case of reaching the specified minimum period of time.

In order to avoid the negative influence of measurement errors on the value of the additional switch-off criterion to be checked, this is preferably determined independently of a measured motor current. An embodiment of the disclosure is preferred with which the determination of the additional switch-off criterion depends on the measured motor voltage. Because the motor voltage generally has an essentially constant value in a region that is insensitive to measurement errors during the release process of the automatic parking brake, the motor voltage is well suited to the determination of the minimum period of time.

The period of time for a specified minimum total release travel can be calculated by using a simplified model. This means that the theoretical time can be calculated that the automatic parking brake requires to pass from a clamped state or the start of the release process to the end of a minimum total release travel. Motor parameters are preferably used for calculating said period of time. These can in particular be the motor constant, the transmission ratio of the transmission unit and the motor voltage of the brake motor. It is particularly advantageous here if the motor constant is determined depending on temperature information. The temperature information is preferably a temperature of the brake motor, which can either be measured by means of a sensor or determined in another way. This enables the variability of the motor constants to be estimated and the accuracy of the switch-off criterion to be improved as a result.

In order to obtain a more precise determination of the temporal switch-off criterion, apart from the above, information about a current hydraulic inlet pressure can be taken into account for determination of the at least one additional switch-off criterion. Such an inlet pressure can exist if the automatic parking brake is supported by a hydraulic vehicle brake. In this case the clamping force of the automatic parking brake consists of an electromotive component and a hydraulic component, so that almost no clamping force has to be reduced in an active electromotive way. However, if there is no such inlet pressure, the clamping force must be reduced in an active electromotive way, whereby the period of time can extend by a variable or fixed amount.

Another method according to the disclosure is used to release an automatic parking brake comprising an electric motor brake device for producing an electromechanical clamping force. With the method a motor current is measured redundantly during a release process and the resulting measurement currents are compared with each other. As a switch-off criterion of the release process the measured motor currents must have fallen below a specified threshold value after a defined period of time. If the switch-off criterion is met, the release process can consequently be ended safely and reliably without the risk of a residual drag torque existing. The method preferably dispenses in particular with the use of sensors that are provided for revolution rate measurement.

The method according to the disclosure is carried out in a regulator or controller in a motor vehicle that can be a component of the parking brake system.

BRIEF DESCRIPTION OF THE DRAWINGS

Further features and functionalities of the disclosure are revealed by the description of exemplary embodiments using the accompanying figures. In the figures.

DETAILED DESCRIPTION

Figure 1:
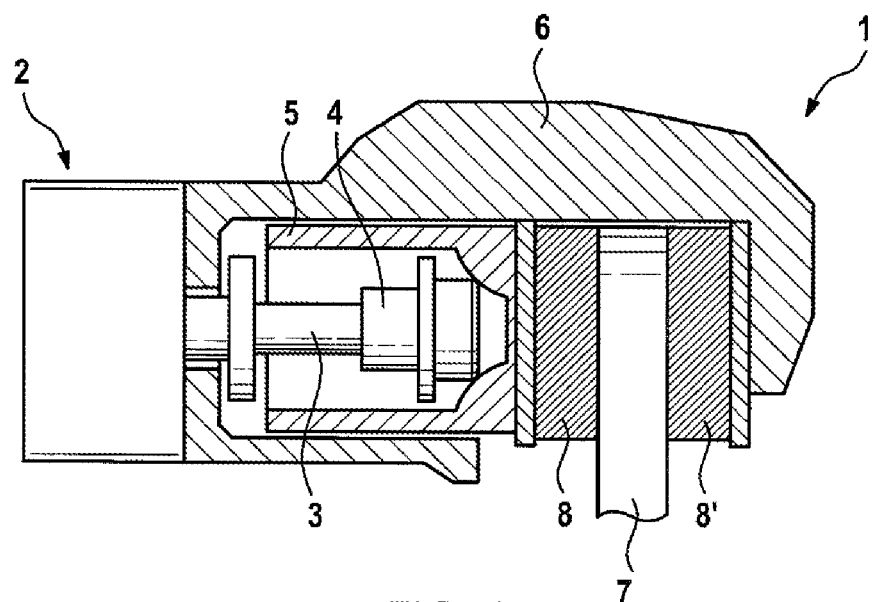
FIG. 1 shows a sectional view of an automatic parking brake for a vehicle with an electric brake motor for producing a clamping force for parking the vehicle.

FIG. 1 shows a sectional view of a known automatic (automated) parking brake 1 for a vehicle, which by means of a brake motor 2 can exert a clamping force for parking the vehicle. The brake motor 2 is in the form of an electric motor in the present case, which drives a spindle 3 mounted in an axial direction, in particular a threaded spindle. The spindle 3 is provided with a spindle nut 4 on its end further from the brake motor 2, said nut contacting an inner end face or a rear side of a brake piston 5 with the automatic parking brake 1 in the clamped state. The spindle 3, the spindle nut 4 and the brake piston 5 are mounted in a brake caliper 6, which extends over a brake disk 7 in the manner of tongs. A respective brake lining 8, 8' is disposed on both sides of the brake disk 7.

During a clamping process of the automatic parking brake 1, the spindle nut 4 is displaced in the axial direction towards the brake piston 5 and the brake disk 7 until the brake piston 5 produces a predefined maximum clamping force on the brake disk 7. In addition to the electromechanical clamping force, the rear side or the base of the brake piston 5 can be acted upon by a hydraulic fluid that is used to reduce the load on the automatic parking brake 1.

The motor voltage and the motor current of the brake motor are used for calculating a travel of the spindle nut 4 without the use of revolution rate sensors, and the spindle travel covered is calculated by means of an algorithm as follows.

$$\Delta s(n+1) = \Delta s(n) + \frac{T_A}{\ddot{u}} \cdot \frac{1}{K} \cdot (u(n+1)) - R \cdot i(n+1))$$

Where u is the measured motor voltage, i is the measured motor current, $\Delta s(n+1)$ is the distance traveled at the current sampling point in time, $\Delta s(n)$ is the distance traveled at the previous sampling point in time, $T_A$ is the sampling frequency (approx. every 5 ms), $\ddot{u}$ is the transmission ratio of the transmission unit including the spindle thread, K is the motor constant, $u(n+1)$ is the voltage value at the current point in time, $i(n+1)$ is the current value at the present point in time and R is the total resistance of the brake motor 2 including the leads from the control unit.

The sampling points in time of the motor voltage u and of the motor current i are in general constant and preferably occur every 5 ms. This means that the present motor current i and the present motor voltage u are averaged over a period of time of 5 ms. The motor constant K and the resistance R are determined during the switch-on peak of the motor current i. The starting values for the estimating method described above are the nominal values of the automatic parking brake 1. The above algorithm for calculating the travel distance covered of the spindle nut 4 gives the result that the distance covered per calculation interval is larger if a small motor constant K exists, a high voltage u is applied, a small resistance R exists and/or the motor current i is low.

During the release process of the automatic parking brake 1, in particular the motor current i changes relatively significantly. This results in an initial very large rise of the motor current i caused by the switch-on process of the brake motor 2, which is typically i>15 A (switch-on peak). After approx. 50 ms the switch-on peak has generally already fallen to the level of a no-load current. The clamping force of the automatic parking brake 1 has completely decreased in this state. The time duration of the no-load current is relatively long and typically has a duration of approx. 800 ms for an average current i of approx. 0.6-1 A.

Figure 2:
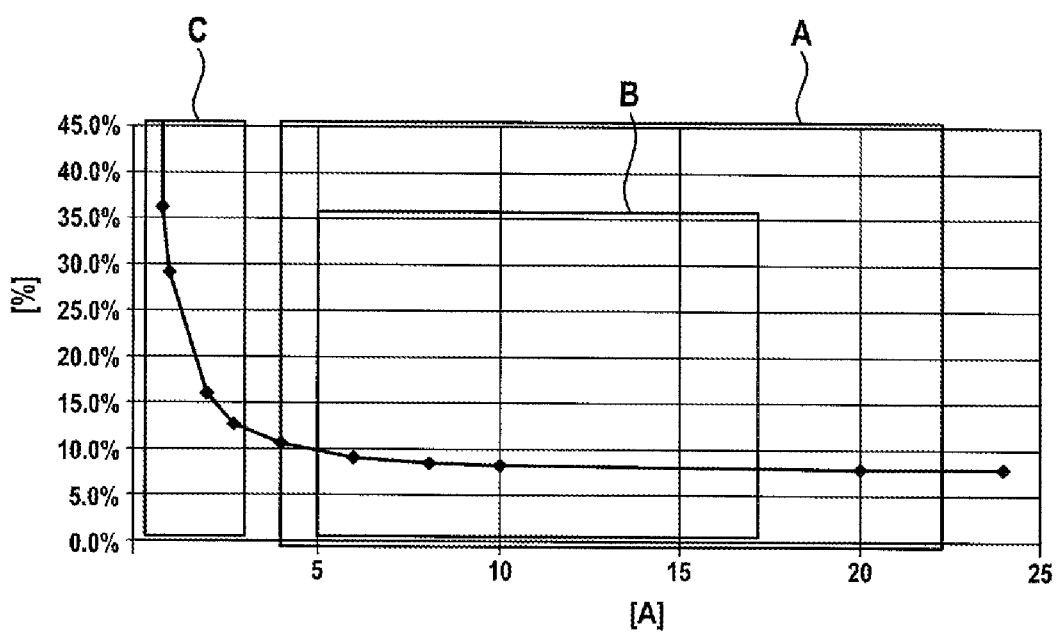
FIG. 2 shows a graph of the distribution of relative current measurement errors with identification of the typical current range of a switch-on peak and during a clamping process of an automatic parking brake.

It is known that higher currents can generally be measured more accurately than low currents. This is shown by FIG. 2, which shows an exemplary graph of the distribution of relative current measurement errors during a clamping process of the automatic parking brake 1. The motor current i is plotted along the abscissa of the graph in the different regions of a clamping process, whereas the ordinate gives the relative current measurement errors. During the clamping process the motor current i initially has the switch-on peak described above, which is designated by the current range A. The typical current range of the clamping process is further designated with B and the typical current profile in the no-load state of the brake motor 2 is designated with C.

It is clear that the relative component of the measurement error during a current measurement rises strongly in the no-load region of the motor current. The current measurement errors result in particular from measurement errors that cannot be compensated and tolerances in the measurement chain. Thus the measurement result is for example dependent on the measurement resolution of the AD converter.

Depending on the selected measurement resolution, components that cannot be compensated can lie within the same order of magnitude as the actual measurement signal. Consequently, there can be a one hundred per cent measurement deviation, whereby the measurement result can have a significant error. At larger currents the influence of the measurement resolution increasingly loses significance, because it is relatively small in comparison with the magnitude of the current. Overall the signal measurement tolerance is very high at low currents. That is, measurement errors in the region of approx. 30% must be tolerated and incorrect monitoring of the measurement current must be able to be excluded.

Figure 3:
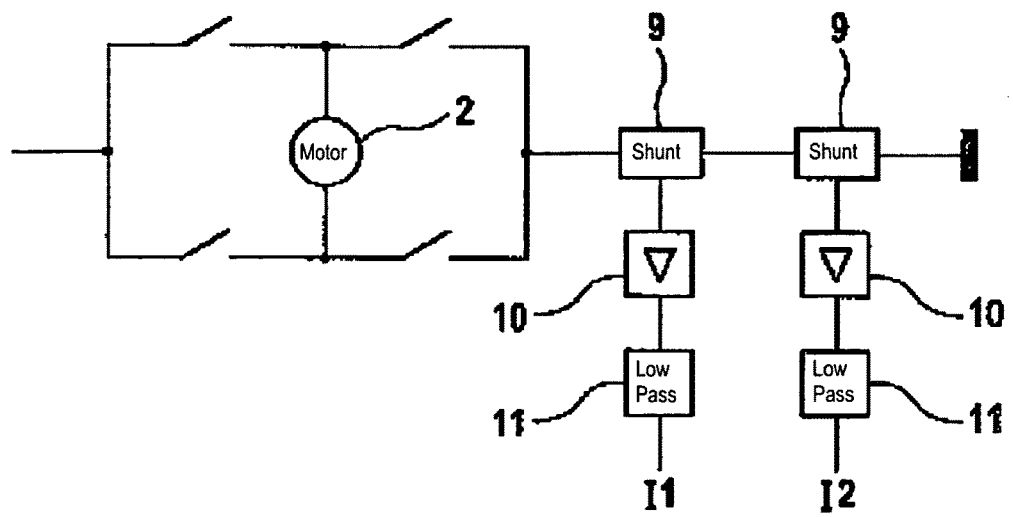
FIG. 3 shows a schematic representation of a circuit for the redundant formation of a current measurement path.

In order to be able to identify current measurement errors, redundant current measurement paths are used, as is shown in FIG. 3. The current is divided into two measurement paths I1 and I2 here, which are measured by means of two measurement resistances (shunts) 9, 9' connected in series. Both measurement paths I1 and I2 are associated with their own amplifier circuit 10 and low pass 11, through which the currents pass before they are analyzed by means of an AD converter (not shown) and provided to software in a regulator or a controller. Both currents I1 and I2 can now be directly compared with each other. In the case in which the difference between the two currents exceeds a specified threshold value, for example a warning signal can be output to a driver of a vehicle, which advises of a potential electrical fault in the automatic parking brake 1.

Figure 4:
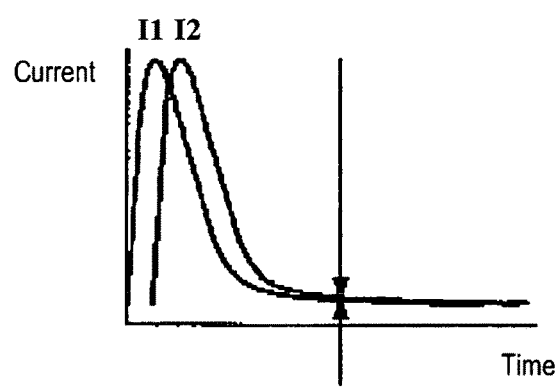
FIG. 4 shows a schematic graph of two measurement currents after passing through the current measurement path according to FIG. 4 in comparison.

In the case of the redundant measurement of the motor current i described with respect to FIG. 3, the low pass, through which each of the partial currents I1 and I2 flows, has associated tolerances. The cut-off frequency of the low passes can for example nominally be defined at 200 Hz. Because of component tolerances the cut-off frequencies can, however, deviate significantly from their nominal value. In particular, cut-off frequencies of 150 Hz or 300 Hz are possible. In addition to the high dynamic range during the switch-on peak, we thus get a phase offset of the two measurement currents I1 and I2, as indicated in FIG. 4. Because the actually effective phase offset is not known, an apparent measurement deviation can thus occur for two otherwise identical signals. Overall it can thus be stated that higher currents are advantageous in relation to the measurement tolerance. At the same time it is noticeable that precisely in the case of higher currents a greater dynamic range of the current change also occurs. This can result in excessive distortions of the signals, which impose a possible phase offset in the signal waveform through component tolerances.

On the other hand, a measurement region can be selected for the exclusion of a current measurement error by comparison of the two measurement currents, not having a large dynamic range and being designated in FIG. 4 with the arrows on the right in the figure. The distortion of the two currents I1 and I2 by component tolerances and a resulting phase offset is almost excluded in said quasi-stationary measurement region. However, the measured current is generally very small and the undetected measurement errors, as explained above, can thus be very large.

According to the present disclosure, an additional switch-off criterion is therefore used during the release process. This ensures that a minimum total release travel of the spindle nut 4 has actually been achieved and that an undetected current measurement error has not resulted in an incorrect calculation of the release travel.

The additional switch-off criterion is preferably a period of time that is calculated by a very simplified model using constant values for the motor parameters. This enables the calculation of the time associated with a specified total release travel that the spindle nut 4 requires to carry out the total release travel. The specified total release travel is that travel distance of the spindle nut 4 that is sufficient to open the automatic parking brake 1 sufficiently wide and thus to avoid residual drag torque between the brake disk 7 and the brake linings 8, 8'.

In one embodiment of the present disclosure, the calculation of the temporal switch-off criterion is achieved exclusively by the use of the measurement voltage u. The current component ($-R \cdot i(n+1)$) is neglected in this version and can thus in particular be used for optimally rapid brake motors 2 having a current demand of i ~0 A. The calculation of the temporal switch-off criterion $t_{ges}$ can be carried out by means of the following formula:

$$t_{ges} = \frac{\Delta s \cdot \ddot{u} \cdot K}{u}$$

wherein $\Delta s$ is the specified total release travel of the spindle nut 4, $\ddot{u}$ is the transmission ratio of the transmission unit including the spindle thread, K is the motor constant and u is the motor voltage. If we use the following values for the motor parameters and the specified total release travel $t_{ges}$ by way of example: $\Delta s=1.4$ mm, $\ddot{u}=5 \cdot 10^5$ 1/m, $K_{min}=0.010$ Nm/A and u=12V, we get:

$$t_{ges\_min} = \frac{\Delta s \cdot \ddot{u} \cdot K_{min}}{u} = 583 \text{ ms}$$

After 583 ms of the release process it can thus be ensured that the spindle nut 4 has traveled wide enough to ensure full release of the brake linings 8, 8' from the brake disk 7. In contrast, using a nominal motor constant $K_{nom}=0.014$ Nm/A a nominal switch-off time $t_{ges\_nom}$ results as the switch-off criterion, which is calculated as follows:

$$t_{ges\_nom} = \frac{\Delta s \cdot \ddot{u} \cdot K_{nom}}{u} = 817 \text{ ms}$$

The use of nominal motor parameters thus results in a reduced minimum duration of the release process. Using the fact that after $\Delta s=1.0$ mm the automatic parking brake 1 is normally released and after a further 0.4 mm the brake system is no longer operating mechanically but entirely hydraulically, in the limiting case the following relationship can be used:

$t_{ges\_nom}/t_{ges\_min}=K_{nom}/K_{min}=0.014$ Nm/A/0.010 Nm/A and consequently 817 ms/583 ms=1.4, wherein the corresponding release travel to be achieved $\Delta s_{nom}/\Delta s_{min}=1.4$ mm/1.0 mm=1.4. This means that the automatic parking brake 1 at $t_{ges}=583$ ms itself just opens wide enough in the least favorable case to avoid a residual drag torque.

In other words, the release process of the automatic parking brake 1 up to the specified minimum total release travel can never take place faster than $t_{ges}=583$ ms with an assumed constant voltage of u=12 V. By using the minimum time for the release process calculated in this way, it can thus be avoided that a minimum travel of the spindle nut 4 traversed is not achieved by using a calculation carried out independently of a measured current i and of a thereby incorrectly estimated motor constant K or motor resistance R.

The process in a program for ensuring the achievement of the minimum total release travel $\Delta s_{ges}$ of the spindle nut 4 can be as follows in this case:

```
IF (Δs ≥ 1.4 mm AND        t ≤ 583 ms)
THEN    Continue the release process
ELSE    End the release process
END
```

In an alternative embodiment of the disclosure the current component (−R·i(n+1)) can be taken into account in the calculation of the switch-off criterion. In this case the temporal switch-off criterion should, however, be calculated with a minimum possible motor resistance R and with a smallest possible no-load current. The minimum no-load current must be determined in advance for this purpose by means of measurements on a plurality of specimens of brake motors 2. The calculation of the minimum switch-off time $t_{ges}$ as the switch-off criterion for the release process is then calculated as follows:

$$t_{ges} = \frac{\Delta s \cdot \ddot{u} \cdot K}{u - R \cdot i}$$

The above formula makes it clear that the numerator is smaller when taking into account the measured motor current i than when neglecting said component. Furthermore, it can be seen that the minimum time for the specified minimum total travel of the spindle nut 4 is increased by this relationship. In this way it is still reliably ensured that the automatic parking brake is sufficiently open following the end of the release process to avoid a residual drag torque.

In a corresponding way a maximum release travel can also be determined by using a time criterion. The time that the automatic parking brake requires for adequate release can thus be limited at the high end. In this case the corresponding maximum values of the automatic parking brake or of the release process must be used as a basis for the calculation of the switch-off criterion. These are for example $i_{max}$=4 A, $R_{max}$=1Ω and $K_{max}$=0.018 Nm/A. When calculating the maximum permissible duration of the release process the following results:

$$t_{ges\_max} = \frac{\Delta s \cdot \ddot{u} \cdot K_{max}}{u - R \cdot i} = 1575 \text{ ms}$$

When using a particularly sluggish transmission and a corresponding high motor current consumption of for example i=4 A and corresponding high line and transfer resistances R and a maximum motor constant K, the magnitude of the maximum permissible time to open the automatic parking brake is thus $t_{ges}$=1575 ms.

A process in a program for determining the achievement of the maximum total release travel of the spindle nut 4 can be as follows in this case:

```
IF (Δs ≥ 1.4 mm AND t ≥ 1575 ms)
THEN    End the release process
ELSE    Continue the release process
END
```

Figure 5:
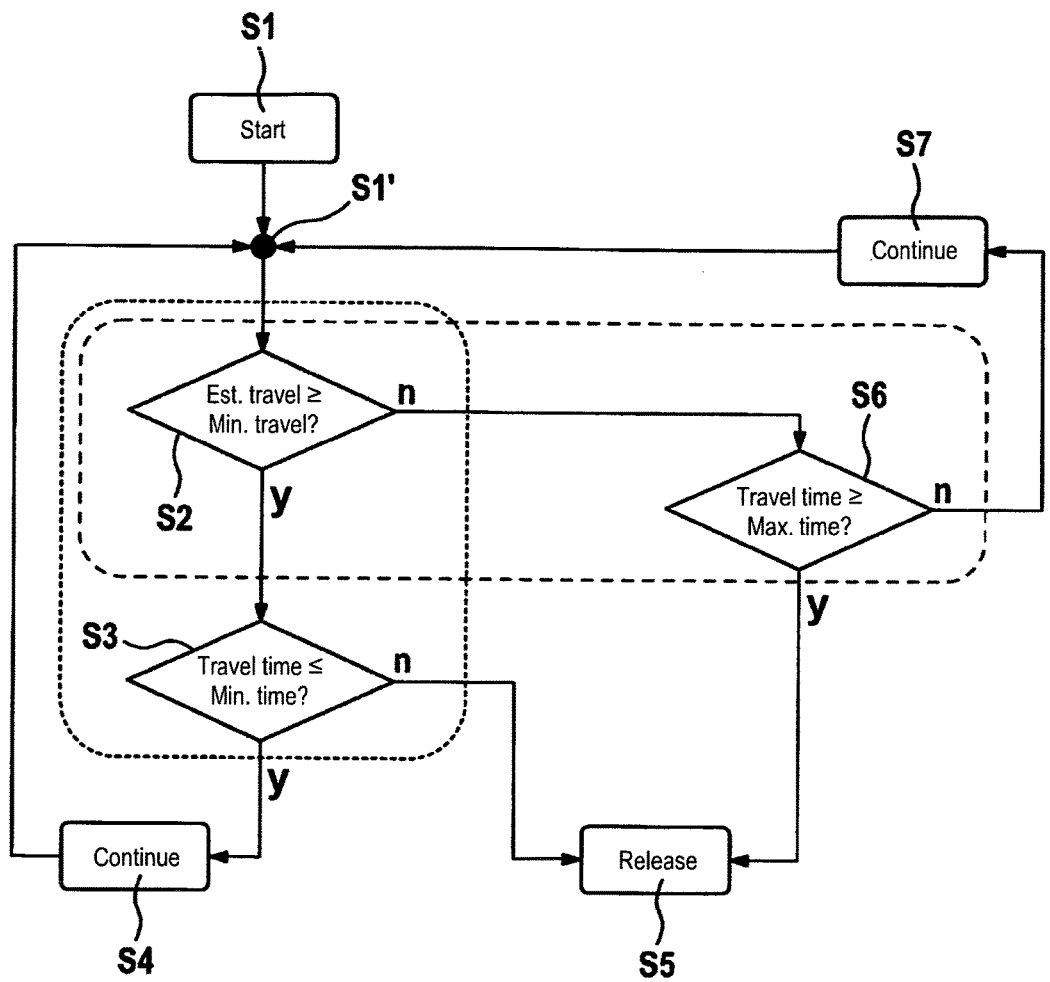
FIG. 5 shows a flow chart of a release process of an automatic parking brake according to the disclosure implemented in a regulator or a controller.

A corresponding flow chart for ensuring the achievement of the minimum total release travel of the spindle nut 4 is illustrated in FIG. 5. In the case of the exemplary embodiment of the disclosure shown in FIG. 5, not only is a minimum switch-off criterion taken into account, but also a maximum temporal switch-off criterion. In a step S1 initially the start signal is given for the release process of the automatic parking brake 1, which is initiated by the driver of the vehicle. In a step S2 the comparison of the calculated (estimated) release travel Δs of the spindle nut 4 with the specified minimum total release travel, which in the present example is 1.4 mm, is then performed. The query formula may for example be as follows: Δs≤1.4 mm? If the calculated release travel is equal to or greater than the specified minimum total release travel of the spindle nut 4, the check of an additional switch-off criterion takes place in a further step S3. The query of the additional minimum switch-off criterion may be as follows: t≤583 ms? In the example shown a check of the duration t of the release process following the start thereof takes place in the step S1 with a minimum temporal switch-off criterion, which by way of example has a magnitude according to the above calculation of 583 ms. If the result of the comparison is that the time t since the start of the release process is still below the minimum temporal switch-off criterion, then the routine continues at the point S1' and the criterion is checked again in the step S2. If by contrast the result of the comparison is that the time t since the start of the release process has reached or exceeds the minimum temporal switch-off criterion, then the routine for releasing the automatic parking brake is ended in a step S5.

If by contrast the calculated release travel in the step S2 is not equal to or greater (but is smaller) than the specified minimum total release travel of the spindle nut 4, in the exemplary embodiment shown the check of a maximum switch-off criterion additionally takes place in a step S6. In the present case, a check of the duration t of the release process following the start thereof takes place in the step S1 with a maximum temporal switch-off criterion, which by way of example has a magnitude of 1575 ms according to the above calculation. The query of the additional maximum switch-off criterion may be as follows: t≥1575 ms? If the result of the comparison is that the time t since the start of the release process is still less than the maximum temporal switch-off criterion, then the routine continues in the step S7 or S1' and the criterion is checked again in the step S2. If by contrast the result of the comparison is that the time since the start of the release process has reached or exceeds the maximum temporal switch-off criterion, then the routine for releasing the automatic parking brake 1 is ended in the step S5. In the step S5 the automatic parking brake is consequently open sufficiently wide in any case so that a residual drag torque is always avoided. It goes without saying that the selected numerical values are purely exemplary and can be varied according to the application.

In an alternative embodiment of the disclosure, both current curves I1 and I2 (see FIG. 4) must have fallen below a defined current value within a defined time after the switch-on. The earliest possible point in time is defined here by the highest voltage to be expected, for example 16 V, and the largest motor constant K (at a low temperature of for example −40° C. together with a maximum within the spread of values). The latest possible point in time is accordingly at the lowest voltage u, for example u=10 V, the smallest motor constant K (at a high temperature of, for example, +80° C. together with a minimum within the spread of values). In addition, the phase offset of the two measurement current curves I1 and I2 described above resulting from the low passes can be taken into account. This embodiment also ensures that measurement errors do not result in insufficient opening of the automatic parking brake 1.

Overall, the present disclosure provides an advantageous method that avoids an inadequate opening of an automatic parking brake 1 by a release process that has associated measurement errors. For this purpose, the disclosure provides at least one additional switch-off criterion that is queried during the program sequence of the release process. In this case the respective switch-off criterion is designed such that it can ensure an adequate travel of the spindle nut 4 for any release process regardless of a measurement error, in particular by means of measurement of the motor current i. The persistence of a residual drag torque following the opening of an automatic parking brake 1 is reliably avoided in this way.

A method according to the disclosure is preferably implemented in the form of a program (software) in a controller or regulator that can be disposed in proximity to the automatic parking brake 1 or at another location in the motor vehicle and that in particular forms a part of the automatic parking brake 1.

What is claimed is:

1. A method for releasing an automatic parking brake, the automatic parking brake including an electric motor configured to produce an electromechanical clamping force, comprising:
    operating the electric motor to release the automatic parking brake;
    measuring, during the release of the automatic parking brake, a motor voltage and a motor current of the electric motor;
    estimating, during the release of the automatic parking brake, a distance traveled by the automatic parking brake since a start of the release of the automatic parking brake, a value for the estimated distance traveled being determined based on the measured motor voltage and the measured motor current;
    ending the release of the automatic parking brake by switching off the electric motor dependent on a comparison of the estimated distance traveled with a minimum total distance traveled; and
    ending the release of the automatic parking brake by switching off the electric motor dependent on an additional switch-off criterion that ensures that the minimum total distance traveled has been achieved.

2. The method according to claim 1, wherein the additional switch-off criterion is a period of time measured from a time the method starts, the period of time being a minimum or a maximum period of time.

3. The method according to claim 1, wherein the additional switch-off criterion is independent of the measurement of the motor current.

4. The method according to claim 1, further comprising:
    determining the additional switch-off criterion based on the motor voltage.

5. The method according to claim 1, further comprising:
    determining the additional switch-off criterion based on a motor constant, a predetermined total release distance, a transmission ratio of a transmission unit, and the motor voltage.

6. The method according to claim 5, further comprising:
    determining the motor constant based on temperature information.

7. The method according to claim 1, further comprising:
    determining the additional switch-off criterion based at least in part on information about an existing hydraulic inlet pressure.

8. A method for releasing an automatic parking brake, the automatic parking brake including an electric motor configured to produce an electromechanical clamping force, comprising:
    operating the electric motor to release the automatic parking brake;
    measuring a first measured value for a motor current of the electric motor with a first measurement circuit during the release of the automatic parking brake;
    measuring a second measured value for the motor current of the electric motor with a second measurement circuit during the release of the automatic parking brake;
    comparing the first measured value for the motor current with the second measured value for the motor current; and
    ending the release of the automatic parking brake by switching off the electric motor in response to the first and second measured values for the motor current falling below a predetermined threshold value after a predetermined period of time.

9. The method of claim 8, wherein a regulator is configured to perform the method.

10. The method of claim 9, wherein the regulator is included in the automatic parking brake in a motor vehicle.

11. The method of claim 8, wherein a controller is configured to perform the method.

12. The method of claim 11, wherein the controller is included in the automatic parking brake in a motor vehicle.

* * * * *